United States Patent [19]

Pearson et al.

[11] 3,917,019
[45] Nov. 4, 1975

[54] VEHICLE AND SAFETY DEVICE FOR SAME

[75] Inventors: Leonard Charles Pearson, Wokingham; Victor James Jehu, Crowthorne, both of England

[73] Assignee: National Research Development Corporation, London, England

[22] Filed: Mar. 5, 1973

[21] Appl. No.: 338,264

[30] Foreign Application Priority Data
Mar. 6, 1972  United Kingdom............... 10300/72

[52] U.S. Cl............. 180/82 C; 180/103; 242/107.6; 280/150 SB; 297/388
[51] Int. Cl. ............................................. B60r 21/10
[58] Field of Search ............. 280/150 SB; 180/82 C; 297/388; 242/107.6

[56] References Cited
UNITED STATES PATENTS

| | | | |
|---|---|---|---|
| 2,852,270 | 9/1958 | Hunt | 280/150 SB |
| 2,858,144 | 10/1958 | Oppenheim | 280/150 SB |
| 3,182,923 | 5/1965 | Botar | 280/150 SB |
| 3,240,510 | 3/1966 | Spouge | 280/150 SB |
| 3,491,966 | 1/1970 | Curran et al. | 280/150 SB |
| 3,506,083 | 4/1970 | Botnick et al. | 180/82 C |
| 3,522,918 | 8/1970 | Wrighton | 242/107.6 |
| 3,547,490 | 12/1970 | Stoffel | 280/150 SB |
| 3,550,875 | 12/1970 | Stettimi | 280/150 SB |
| 3,610,361 | 10/1971 | Pringle | 180/82 C |
| 3,764,161 | 10/1973 | Bright et al. | 180/82 C |

*Primary Examiner*—David Schonberg
*Assistant Examiner*—John P. Silverstrim
*Attorney, Agent, or Firm*—Cushman, Darby & Cushman

[57] ABSTRACT

A safety device for vehicles and their passengers comprises a restraining member, for instance a seat belt wound on a reel. A spring tends to wind in the reel, so that the member normally lies comfortably taut across the body of a seated passenger. A clutch operates in response to certain conditions of the vehicle to prevent the spring winding the reel in, while the reel can still wind out. This allows the belt to slacken to permit passengers to enter and leave their seats without difficulty. Appropriate conditions of the vehicle may include the opening of doors or the turning-off of the ignition system. When the condition ceases the spring first takes up the slack then holds the belt taut as before.

5 Claims, 4 Drawing Figures

VEHICLE AND SAFETY DEVICE FOR SAME

This invention relates to vehicles and safety devices for them. In particular it relates to the spring-loaded reels used in car safety harness systems of the inertia type. In such systems the reel can pay out harness to allow the occupant to move gently, but the inertia device prevents the reel from thus paying out if the occupant or car changes speed violently, indicating the onset of an accident.

Clearly such harness systems are of no use unless occupants actually wear them when the car is in motion. Various systems have been proposed that automatically fit themselves over the occupants of a car as they enter, or at least before the car starts to move. In one such system for protecting the driver of a car (systems to protect each passenger would be similar in principle) a safety strap is mounted on a spring-loaded reel, the reel is mounted on the driver's door and the free end of the belt is mounted on the floor of the car between the two front seats. When the door is closed, the belt lies across the chest of the driver. The inertia device responds to the onset of an accident to lock the reel and thus hold the belt tight. When the driver opens the door normally, the inertia device does not lock and the reel pays out belt against the action of the spring. Thus when the driver wants to enter his car the belt is tight across the seat when he has opened the door, and remains tight thereafter; the driver therefore has to squeeze between the seat and the taut belt lying across it.

Our invention offers a way of overcoming this disadvantage, and includes both vehicle safety devices and vehicles when fitted with such devices. It is defined by the claims at the end of this specification, and will now be described, by way of example, with reference to the accompanying drawings in which:

Figure 1:
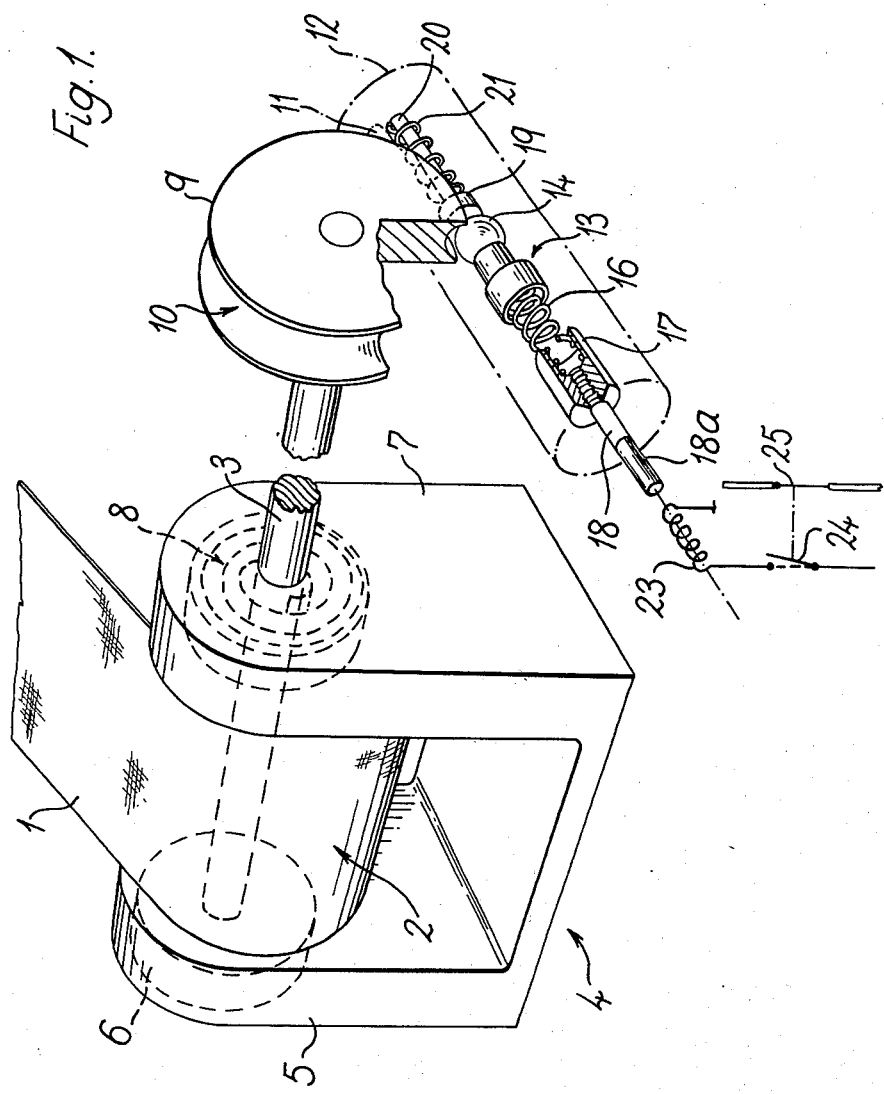
FIG. 1 is a diagrammatic perspective view of a safety device, partly cut away.
Figure 2:
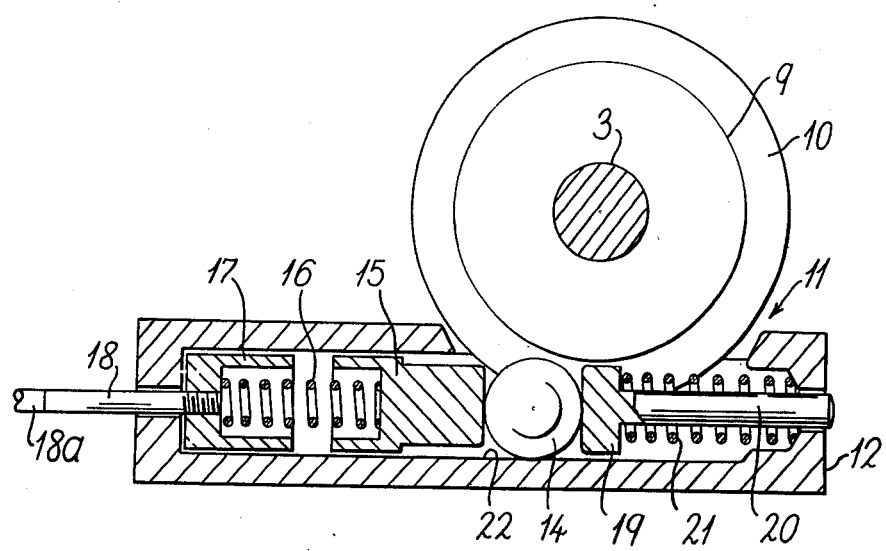
FIG. 2 is a section through part of the device shown in FIG. 1.
Figure 3:
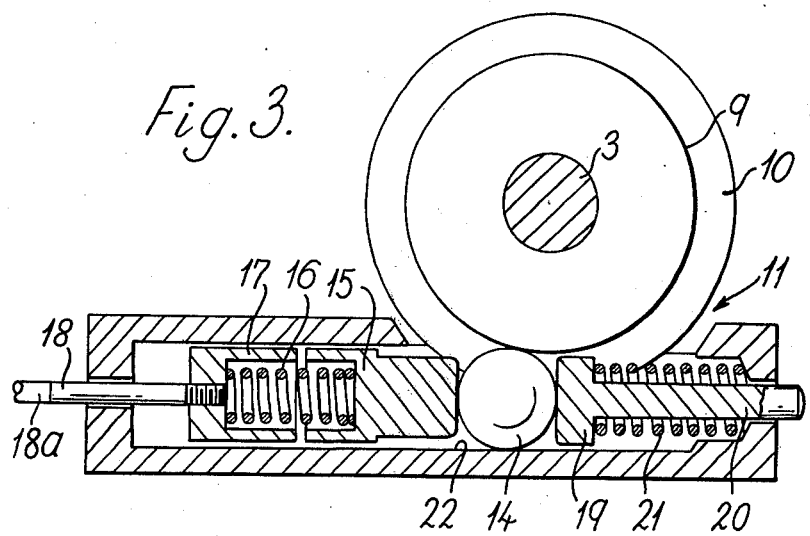
FIG. 3 shows the same parts as FIG. 2 but at a different stage of operation.
Figure 4:
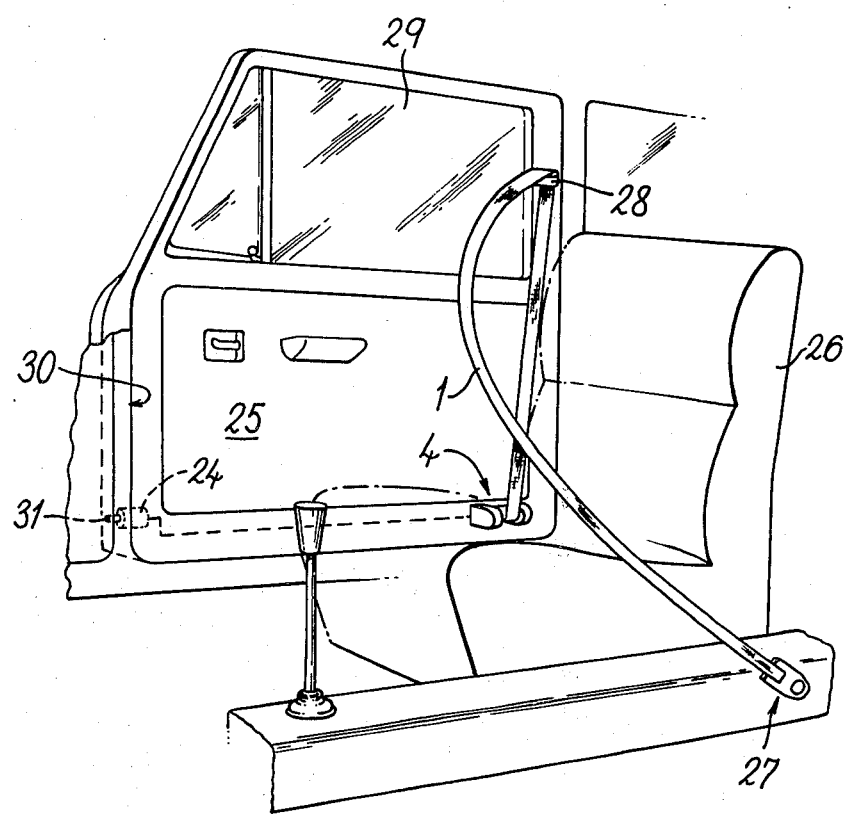
FIG. 4 is a diagrammatic perspective view of part of a vehicle fitted with the device of FIGS. 1–3.

FIGS. 1–3 show part of the mechanism of a vehicle safety device comprising a safety belt, of the inertia reel type, for the driver's seat of a car. The restraining member or belt 1 is coiled on a drum 2 having an axle 3 supported by a two-armed housing 4. As FIG. 4 shows, this housing is mounted on the inside face of the driver's door and the remote end of belt 1 is fixed to the floor of the car between the two front seats. In use, the belt passes across the chest of the driver.

On the remote face of the first arm 5 of the housing 4 is mounted an inertia device 6. This device is of a known type and is sensitive to the onset of an accident. For example, it could be sensitive to rapid deceleration of the car; on sensing this, it prevents belt 1 unwinding from drum 2. It never prevents the drum from winding in the belt. In the other arm 7 of housing 4 axle 3 carries tensioning means in the form of a spring 8 which loads drum 2 so that it tends to wind in the belt. This spring causes the belt to remain taut across the driver as he moves gently in his seat while the car is in motion.

Axle 3 also carries a pulley 9 with groove 10. A segment of this pulley intrudes into a slot 11 in the housing 12 of a check device, in which slides a plunger 13 comprising a ball 14 and a piston 15 joined by a compression spring 16 to a cup-shaped housing 17 mounted on a non-magnetic part of a rod 18. To the other side of ball 14 lies a piston 19 mounted on a rod 20 co-axial with rod 18, and loaded by a compression spring 21 which bears upon housing 12.

FIG. 2 shows ball 14 in its normal (e.g. car door closed) position in which it is held out of engagement with pulley 9 by piston 19 and spring 21. The spring 21 also pushes rod 18 to the left-hand end of its stroke; spring 16 is therefore relaxed so that it yields to the force of spring 21. In the position shown in FIG. 3, however, plunger 18 has been moved to the right-hand end of its stroke, thus compressing spring 16 so that it overcomes spring 19 and wedges ball 14 between groove 10 and the inner floor 22 of housing 12, preventing pulley 9 from rotating anti-clockwise and so preventing belt 1 from reeling in upon drum 2. If the belt is now pulled, however, it will unwind because clockwise movement of pulley 9 will dislodge the ball, which will wedge again when the pull ceases.

Rod 18 may be moved to the right, against the force of spring 21, by energising triggering means in the form of a solenoid device 23 in circuit with a switch 24, which is open whenever the car door 25 is shut but is closed whenever it is not. Solenoid device 23 co-operates with a magnetic cap 18a of rod 18. Alternatively the solenoid could be in circuit with the car ignition, or some other device associated with the state of the car, operating so that ball 14 lies clear of pulley 9 whenever the risk of a vehicle accident is relatively great, for example, when the car is moving or about to move, but may be allowed to wedge and so permit the belt to fall slack at other times.

FIG. 4 is a diagrammatic perspective view, from the front of the driver's seat 26 and door 25 of a vehicle according to this invention. The free end of the belt 1 is anchored to the vehicle floor at 27, between the two front seats. The belt passes across the seat and through a fairlead 28, anchored to the door structure close to its trailing edge and at a level approximately equal to the mid-height of the door window 29. From the fairlead the belt passes to the drum 2, fixed to the door structure close to the lower trailing corner. The switch 24 is mounted in the door close to its lower forward corner, is of the plunger type and co-operates with the door frame 30. When the door is closed the plunger 31 is depressed, the contacts of switch 24 are open, and pulley 9 is free to turn in both directions so that belt 1 is held taut. When door 25 opens plunger 31 moves out, the contacts of switch 24 close, and pulley 9 is locked so that spring 8 is prevented from reeling in the belt until door 25 closes again and depresses plunger 31. It should be noted that the line of belt 1 shown in FIG. 4 is approximately that which it would take up if a person were sitting in seat 26. If the seat was vacant, and the door 25 closed, the belt would be more taut.

The electrical solenoid device 23 could be replaced of course by some purely mechanical device, for instance a linkage operated by a plunger mounted on the door and sensitive to movement of the door. Other known types of one-way rotary mechanisms could obviously also be substituted for the ball and pulley arrangement shown.

We claim:
1. A vehicle safety device comprising:
   an occupant-restraining member;

means for supporting one end of said member from a door of said vehicle whereby said occupant-restraining member automatically fits itself around an occupant of the vehicle as the door is closed;

non-electric tensioning means for said member, said tensioning means operating to hold said member taut but unlocked in its occupant-restraining position during normal running motion of said vehicle;

a locking device responsive to the onset of a rapid deceleration of said vehicle, said locking device operating to lock said member in its said tautly-held position;

a check device operable to inhibit said tensioning means to thereby permit said member to go slack; and triggering means responsive to a condition which normally exists when the occupant is normally entering and exiting the vehicle for actuating said check device into its tension means inhibiting condition.

2. A vehicle safety device according to claim 1 wherein:
said condition comprises the open state of said door.

3. A vehicle safety device according to claim 1 further comprising:
a reel, said occupant-restraining member being coiled on said reel, and wherein said non-electric tensioning means includes a spring device which tends to wind-in said reel.

4. A vehicle safety device according to claim 1 wherein:
said vehicle includes an ignition system, and
said condition comprises the deenergized state of said ignition system.

5. In a vehicle, an occupant-safety device comprising:
reel means;
a belt coiled on said reel means, said reel means normally permitting wind-out of said belt;
a spring-loading device on said reel means operable to tend to wind-in said belt;
securing means for the end of said belt remote from said reel means;
one of said means being mounted on a door of said vehicle, whereby said belt automatically fits itself around an occupant of the vehicle as the door is closed, said reel means and said securing means cooperating so as normally to hold said belt taut but unlocked across the body of said occupant;
check means operable to prevent said spring-loading device from winding-in said belt while still permitting said belt to wind-out from said reel means; and
triggering means operable in response to a condition which normally exists when the occupant is normally entering and exiting the vehicle for actuating said check means in its operable condition.

* * * * *